United States Patent [19]

Nilsson

[11] 4,141,255
[45] Feb. 27, 1979

[54] MECHANISM FOR TRANSFERRING A ROTARY MOTION INTO AN AXIAL MOTION

[75] Inventor: Sven W. Nilsson, Partille, Sweden

[73] Assignee: SKF Nova AB, Goteborg, Sweden

[21] Appl. No.: 782,561

[22] Filed: Mar. 29, 1977

[30] Foreign Application Priority Data

May 14, 1976 [SE] Sweden ............................. 7605491

[51] Int. Cl.$^2$ ............................................. F16H 21/16
[52] U.S. Cl. ...................................................... 74/25
[58] Field of Search ............................................ 74/25

[56] References Cited

U.S. PATENT DOCUMENTS

| | | | |
|---|---|---|---|
| 2,940,322 | 6/1960 | Uhing | 74/25 |
| 3,977,258 | 8/1976 | Bauer | 74/25 |
| 4,008,929 | 2/1977 | Olrik | 74/25 |

Primary Examiner—Samuel Scott
Assistant Examiner—Wesley S. Ratliff, Jr.
Attorney, Agent, or Firm—Eugene E. Renz, Jr.

[57] ABSTRACT

A mechanism for transferring a rotary motion into an axial motion. The assembly includes a shaft having a smooth, cylindrical envelope surface, a retainer enclosing the shaft and rotatable relative the shaft. A plurality of bearing housings with bearing seats inclined towards the shaft are arranged in the retainer. Bearings having outer and inner race rings are arranged in the bearing seats. The bore diameter of the inner race rings, which are arranged to enclose the shaft, are larger than the diameter of the shaft. The bearing seats are designed completely to enclose the outer race rings of the bearings. The retainer has a recess having opposing sidewalls defining guide surfaces. The bearing housings are slidable in and guided by the sidewalls of the recess for displacement substantially perpendicularly to the shaft. The bearing housings are subjected to a force in the direction of displacement so as to urge the inner race rings of the bearings against the envelope surface of the shaft.

9 Claims, 3 Drawing Figures

MECHANISM FOR TRANSFERRING A ROTARY MOTION INTO AN AXIAL MOTION

BACKGROUND OF THE INVENTION

The present invention refers to a mechanism of the type for transferring a rotary motion into an axial motion.

Mechanisms of this type are arranged to transfer a rotary motion into an axial motion when the retainer, which surrounds the shaft is rotated. This retainer hereby will cause rotation of the bearing housings, which are arranged to support bearings, the inner race rings of which enclose and engage the envelope surface of the shaft. The inner race rings during the rotation make a helically sliding motion along the envelope surface of the shaft and if the retainer is kept from moving axially the friction between the shaft and the inner race rings of the bearings will cause the shaft to be exerted to an axial force, which can be used for displacing the shaft. It is of course also possible that the shaft is rotated but prevented from axial movement, whereby the retainer can be displaced axially along the shaft.

Mechanisms of this type are earlier known, see for instance Swedish patent application No. 7415741-3. The bearing housing making part of this mechanism comprises two jaws, which are clamped against each other with appropriate means in such a manner that the inner race rings of the bearings are pressed against a throughshaft. As the bearing seats at this device are arranged in two jaws, which are movable relative to each other the device has a shape which varies with the mutual positions of the jaws, whereby a true circular form of the bearing seats cannot be guaranteed, which means that the bearing race rings easily can be clamped to out-of-roundness with negative influences on the service life of the mechanism and on a smooth running as a result. The jaws are furthermore mutually displaced axially by means of the bearings at axial load on the throughshaft, which furthermore will add to the deformation of the bearing seats when the bearings are heavily loaded.

SUMMARY OF THE INVENTION

The purpose of the present invention is to provide a mechanism in which the bearing seats do not change form at variations in the load, but will always maintain the cylindrical form given to them at the manufacture and in which the bearing inner race rings in a simple and efficient manner can be urged against the shaft with sufficient force. This is obtained according to the invention thereby that the mechanism includes bearing seats completely enclosing the outer race rings of the bearings and a recess in the retainer for opposing sidewalls defining guide surfaces for the bearing housings which are slidable and guided therein for displacement substantially perpendicularly to the shaft.

BRIEF DESCRIPTION OF THE DRAWINGS

The invention will in the following be further described with reference to the accompanying drawings.

DESCRIPTION OF PREFERRED EMBODIMENTS

Figure 2:
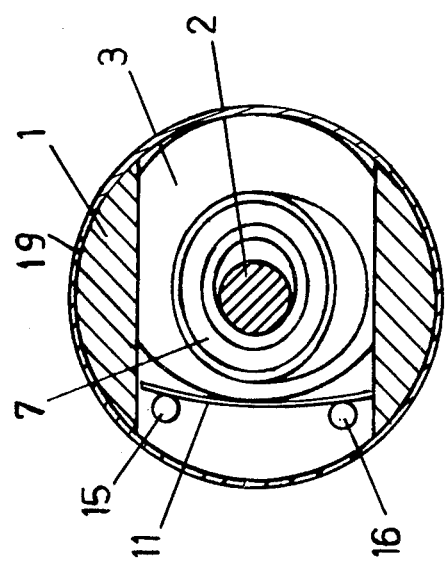
FIG. 2 shows a cross section along line II—II in FIG. 1.

A retainer 1 surrounds a cylindric shaft 2. A recess 1a, which in the embodiment shown has a rectangular cross section defining opposing sidewalls 1b, 1b defining guide surfaces, extends diametrically through the retainer and in this recess there are arranged four bearing housings 3, 4, 5 and 6 slidable in and guided by the sidewalls 1b, 1b. The bearing housings, in the present instance by parallel opposing sides 3a, 4a, 5a, 6a confronting the guide surfaces 1b of the retainer 1 in the assembled relation. The bearing housings are displaceable in the recess substantially perpendicularly against the shaft 2. Ball bearings 7, 8, 9 and 10 are arranged in the bearing housings in bearing seats which are inclined relative to the shaft 2, the bearing seats in the housings 3 and 6 thereby being inclined in opposite direction in relation to the bearings seats of the housings 4 and 5 such as can best be seen in FIG. 1.

The ball bearing inner race rings, the bore diameter of which are larger than the diameter of the shaft 2, enclose the shaft 2 and are pressed to engagement against this as the bearing housings are biased in the direction of displacement by means of a number of flat springs 11, 12, 13 and 14, respectively.

Figure 3:
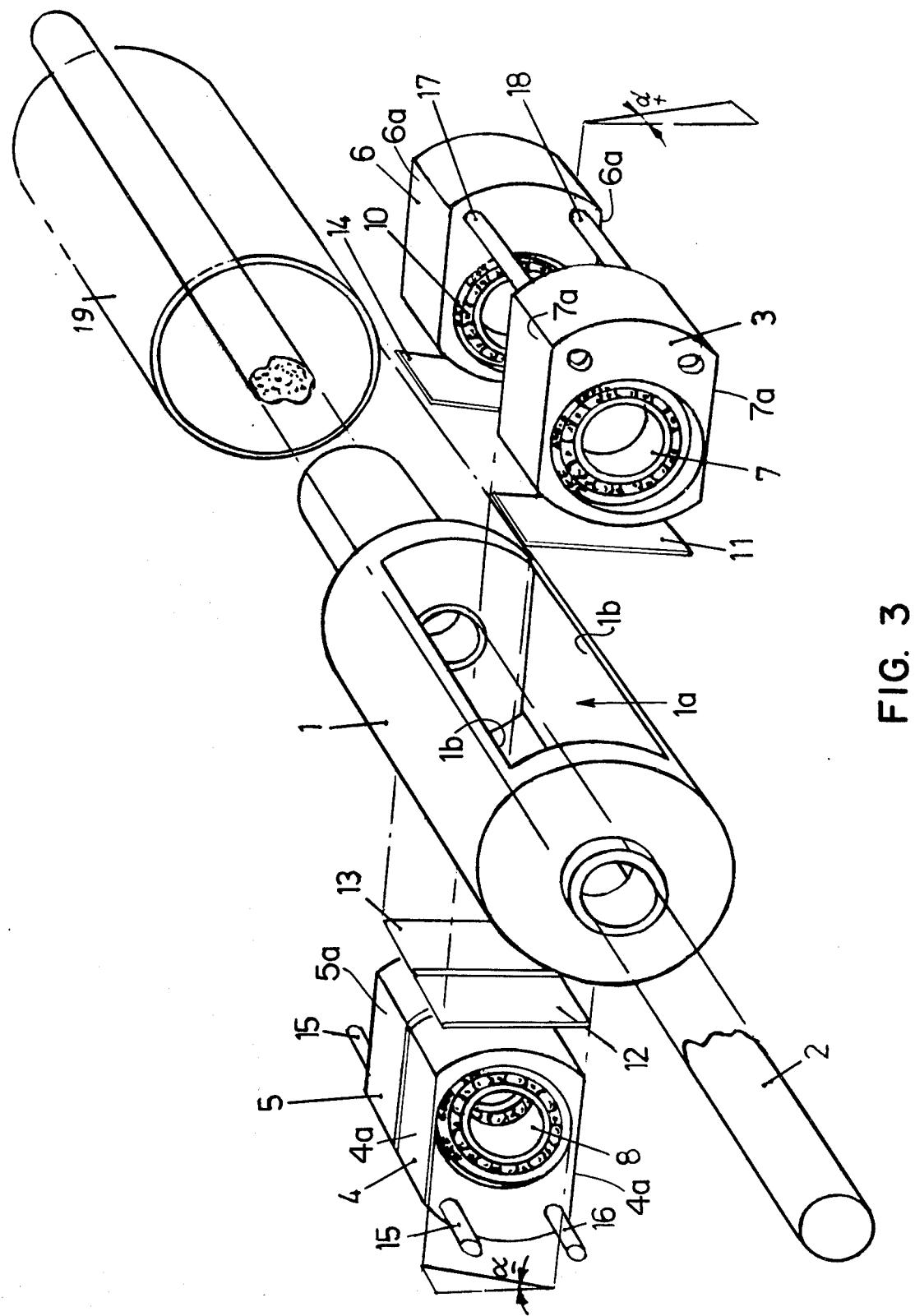
FIG. 3 shows in an exploded elevation the components making part of the mechanism.

The bearing housings are held together into two groups which are moveable in relation to each other, whereby the housings 3 and 6 form one group and the housings 4 and 5 form the other group such as can best be seen from FIG. 3. The retention is preferably achieved by means of dowels 15, 16, 17 and 18 which furthermore are arranged in such a manner that they act as supports for the springs 11, 12, 13 and 14, whereby the springs which engage directly against one of the groups of bearing housings at the same time rest against the dowels which hold together the second group of bearing housings. The two groups of bearing housings are thereby urged in opposite directions without the retainer 1 thereby being acted upon by any spring force.

The bearing housings 3, 4, 5 and 6 are as can best be seen from FIG. 2 in the embodiment shown non-symmetrical in relation to the centers of rotation which coincide with the rotational center of the retainer. This non-symmetry entails that the centers of gravity of the bearing housings will be eccentrically located in relation to the rotation centers which means that the bearing housings will be exerted to centrifugal forces acting in the recess of the retainer in the direction of displacement when the retainer rotates about the shaft 2. It is possible to vary the size of the centrifugal force by providing the bearing housings with additional weights which can be fitted at different distances from the rotational center. In order to avoid unbalance in the system is it ascertained that the vector amount of the centrifugal forces will become zero when the retainer rotates about the shaft. This is obtained in the embodiment shown in the drawings thereby that the number of bearing housings is equal, that all bearings housings are like each other and that half the number of bearing housings are mounted in diametrically opposite directions in relation to the other bearing housings.

The bearings may be mounted either with loose or with hard fit in the bearings seats. If a loose fit is used a clamping effect will arise between the bearing and the shaft 2, if the shaft 2 is displaced axially in relation to the retainer 1. This means that a relative sliding motion between the shaft and the retainer is prevented which can be advantageous in certain connections and a drawback in other. In cases where it is desirous to allow a relative sliding motion between the shaft and the retainer when a certain axial load is exceeded for instance for security reasons, the bearings are mounted with hard fit or fixed in another manner in the seats so as not to be displaceable therein. The contact of the bearings against the shaft hereby will depend only upon the radial forces on the bearing housings i.e. the spring forces and/or the centrifugal forces according to the earlier description.

In order that the bearing inner race rings and the shaft envelope surface shall be exposed to as small surface strains as possible the holes of the race rings are preferably made with a torus-formed wall surface in such a manner that line engagement is obtained against the cylindrical shaft. The angle of the torus generatrix against the bearing axis then must be equal to the angle of the bearing seat inclination against the geometrical axis of the shaft 2.

A retainer according to the invention can preferably be enclosed in a casing 19 and it may be provided with sealing shaft bushings. The entire mechanism will thereby be enclosed and it may be filled with a lubricant, whereby a substantially maintainance free device is obtained and the bearing housings are prevented from falling out of the retainer if the shaft 2 is removed.

Figure 1:
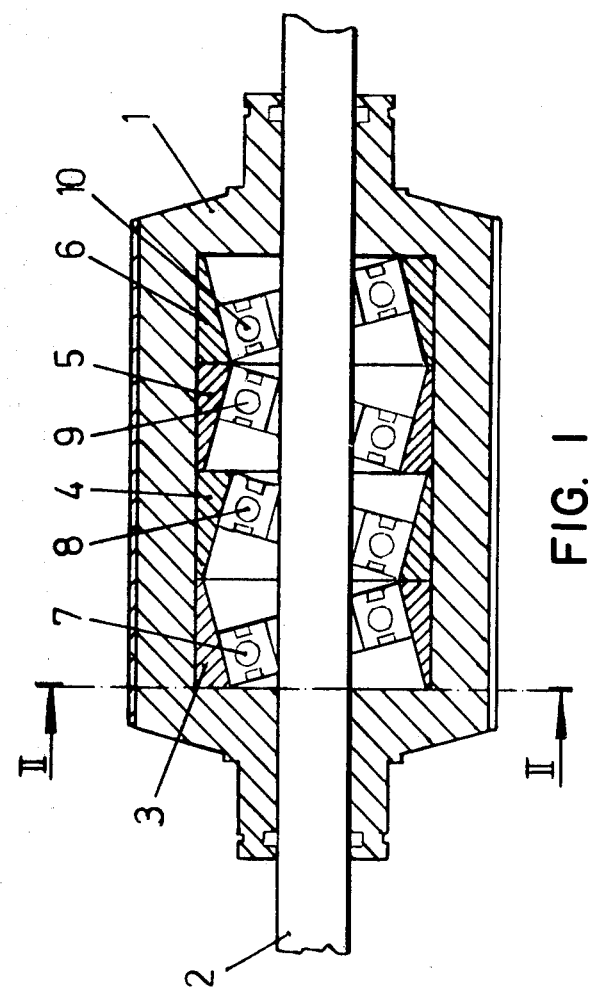
FIG. 1 shows a longitudinal section through an embodiment of the invention.

In a mechanism such as shown in the embodiment in which all bearing housings are moveable in a common plane in the retainer 1 the position of the retainer in relation to the shaft 2 is not settled whereby the retainer must be provided with guidings for centering it on the shaft. This is preferably brought about by providing the retainer with end walls having shaft bushings with sliding engagement against the shaft. Such an embodiment is shown in FIG. 1. It is also possible to arrange different bearing housings or groups of bearing housings which are displaceable in different planes, which together form an angle whereby of course several recesses must be made in the retainer 1. In such an arrangement the position of the retainer 1 is guided by the bearing housings in relation to shaft 2. The difficulties in manufacturing a suitable retainer will however increase as well as the difficulties in avoiding out-of-balance in the rotating system. The last mentioned problem can however be solved by appropriate choice of the different planes of displacement for the retainers forming part of the system and by appropriate distribution of these retainers at the different planes of displacement.

I claim:

1. A mechanism for transferring a rotary motion into an axial motion comprising a shaft (2) having a smooth, cylindrical envelope surface, a retainer (1) enclosing the shaft and being rotatable relative thereto, a plurality of bearing housings (3, 4, 5, 6) with bearing seats inclined towards the shaft being arranged in the retainer, bearings (7, 8, 9, 10) having outer and inner race rings being arranged in said bearing seats, the bore diameter of said inner race rings, which are arranged to enclose the shaft, being larger than the diameter of the shaft, characterized thereby, that the bearing seats are designed completely to enclose the outer race rings of the bearings, and including a recess in said retainer having opposing sidewalls defining guide surfaces, said bearing housings slidable in and guided by said sidewalls for displacement substantially perpendicularly to the shaft, said bearing housings being subjected to a force in the direction of displacement so as to urge the inner race rings of the bearings against the envelope surface of the shaft.

2. A mechanism as claimed in claim 1, characterized thereby, that the bearing housings can be put under load in the direction of displacement as the centers of gravity of said bearing housings are located eccentrically relative to the rotational centers thereof, the bearing housings thereby being exerted to centrifugal forces in the direction of displacement as the retainer rotates about the shaft.

3. A mechanism as claimed in claim 1, characterized thereby, that the bearing housings are subjected to a force in the direction of displacement by means of springs (11, 12, 13, 14) acting upon the bearing housings.

4. A mechanism as claimed in claim 1, characterized thereby, that the bearing housings are arranged in the retainer in such a manner that two bearing housings or groups of bearing housings are urged in opposite directions in their respective directions of displacement by means of springs acting upon the two bearing housings or groups of bearing housings, the retainer thereby not being acted upon by spring force.

5. A mechanism as claimed in claim 1, characterized thereby, that the bearings are fitted in the bearing seats at a loose fit.

6. A mechanism as claimed in claim 1, characterized thereby, that the position of the bearings in the bearing seats are fixed.

7. A mechanism as claimed in claim 1, characterized thereby, that the bores of the inner race rings are torus-formed in order to obtain line engagement with the cylindric shaft.

8. A mechanism as claimed in claim 1, characterized thereby, that the retainer is encased in a casing and provided with sealed-off shaft bushings.

9. A mechanism for transferring a rotary motion into an axial motion comprising a shaft (2) having a smooth, cylindrical envelope surface, a retainer (1) enclosing the shaft and being rotatable relative thereto, a plurality of bearing housings (3, 4, 5, 6) with bearing seats inclined towards the shaft being arranged in the retainer, bearings (7, 8, 9, 10) having outer and inner race rings being arranged in said bearing seats, the bore diameter of said inner race rings, which are arranged to enclose the shaft, being larger than the diameter of the shaft, characterized thereby, that the bearing seats are designed completely to enclose the outer race rings of the bearings, and that the bearing housings are displaceable in the retainer substantially perpendicularly to the shaft, said bearing housings being subjected to a force in the direction of displacement so as to urge the inner race rings of the bearings against the envelope surface of the shaft, and exchangeable weights arranged eccentrically on the bearing housings relative to the center of the shaft.

* * * * *